May 12, 1942.  S. D. BERT  2,282,449

GLASS FORMING MACHINE

Filed Feb. 8, 1940  6 Sheets-Sheet 1

INVENTOR
Samuel D. Bert,
By Archworth Martin,
Attorney.

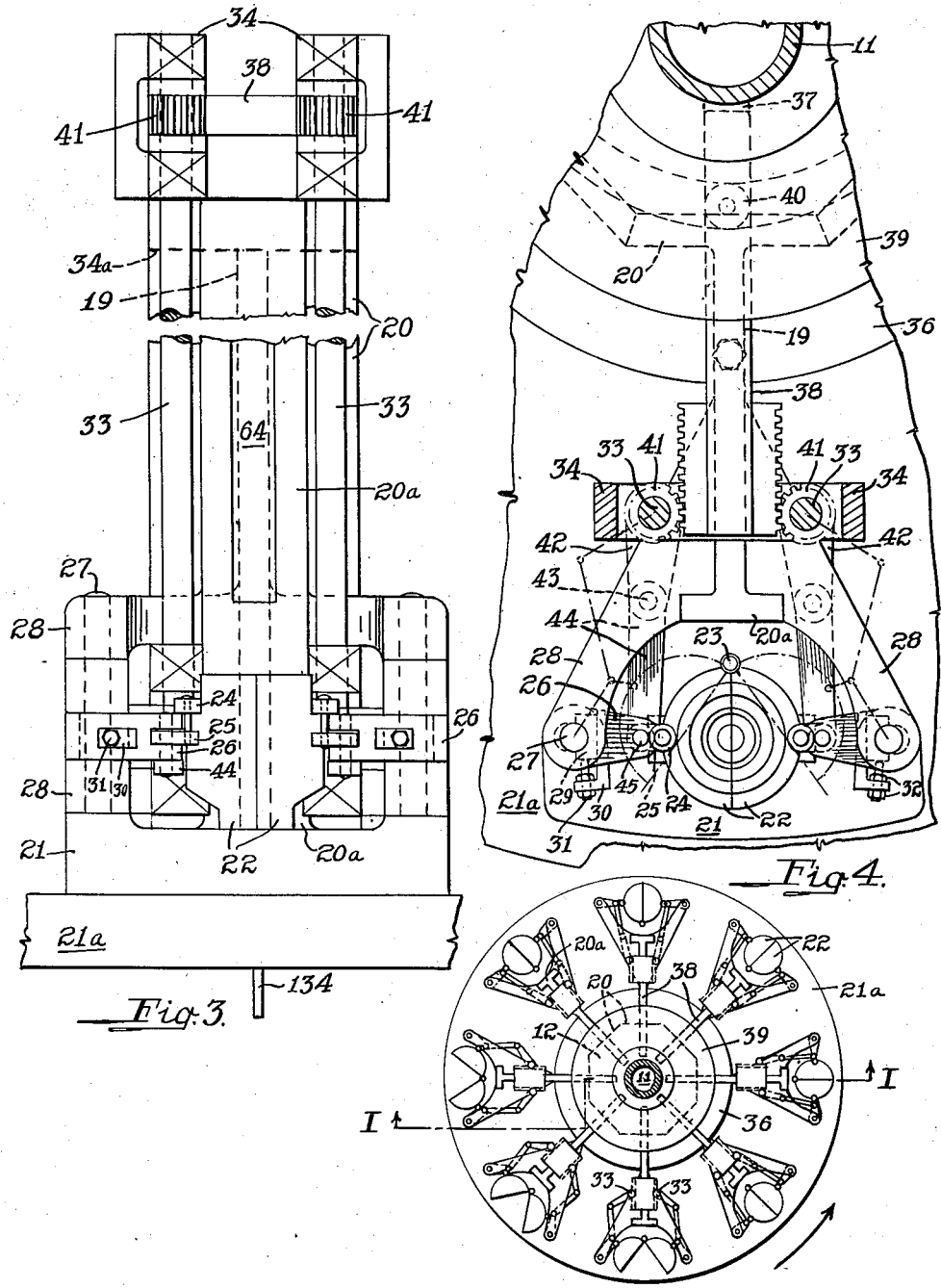

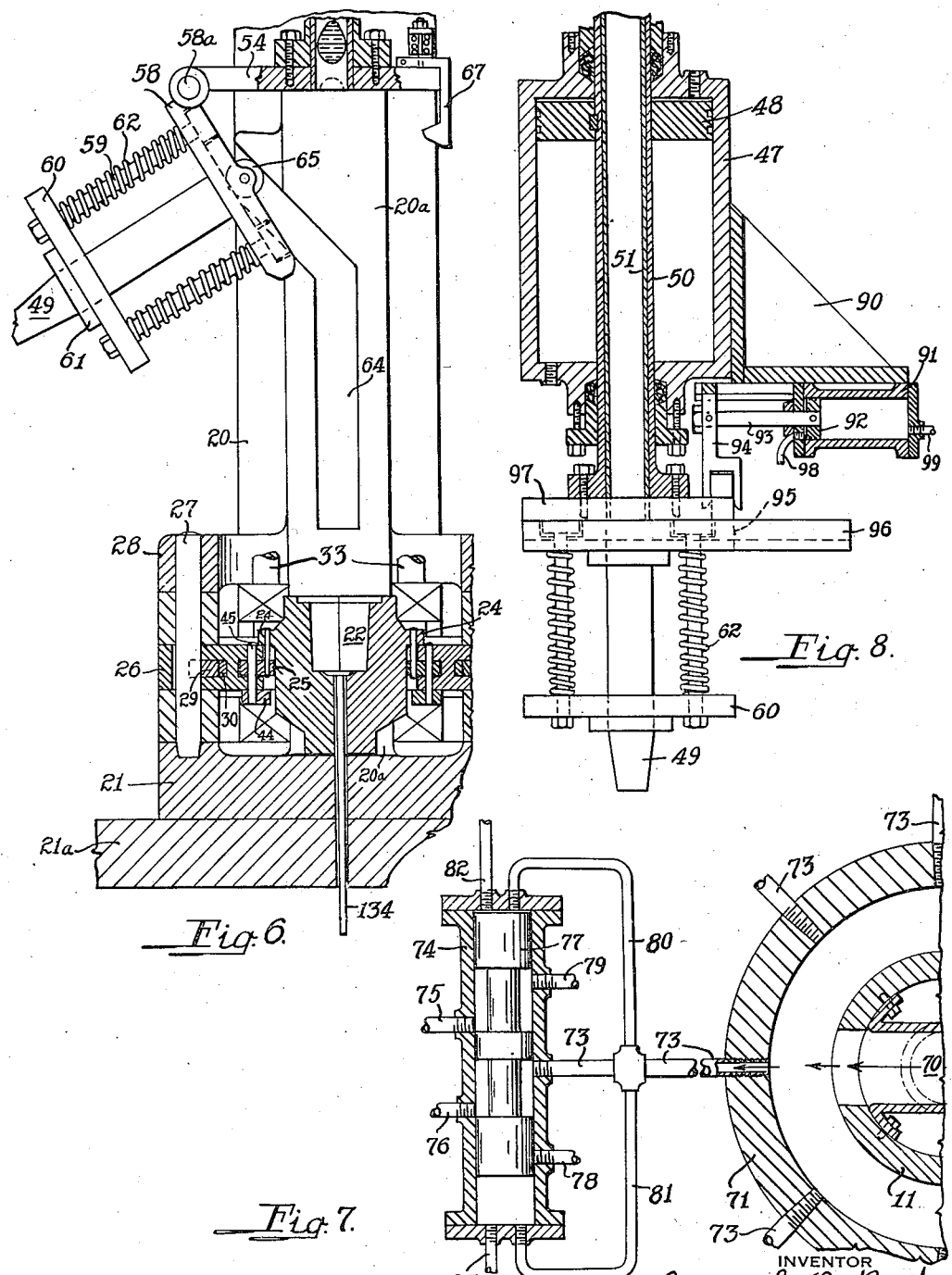

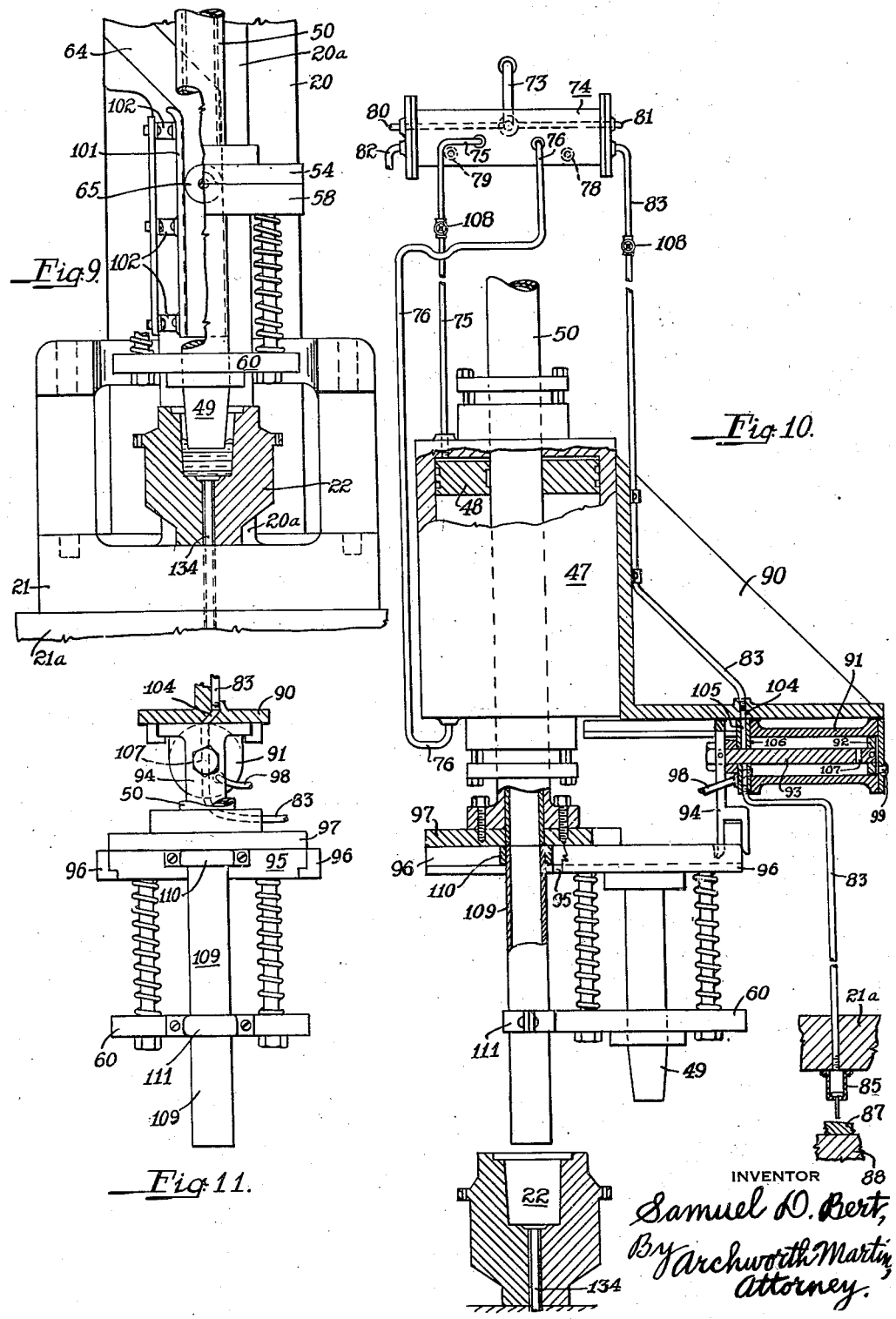

May 12, 1942.　　　　　S. D. BERT　　　　　2,282,449
GLASS FORMING MACHINE
Filed Feb. 8, 1940　　　　　6 Sheets-Sheet 6

INVENTOR
Samuel D. Bert,
By Archworth Martin,
Attorney.

Patented May 12, 1942

2,282,449

UNITED STATES PATENT OFFICE 2,282,449

GLASS FORMING MACHINE

Samuel D. Bert, Washington, Pa., assignor of one-third to Maurice A. Yorkin and one-third to James D. Martin, both of Washington, Pa.

Application February 8, 1940, Serial No. 317,843

10 Claims. (Cl. 49—5)

One object of my invention is to provide a glass-forming machine of such form that it can be continuously operated, without pauses for mold charging and pressing operations.

Another object of my invention is to provide an improved means for introducing mold charges into the molds of a forming machine.

Still another object of my invention is to provide an improved manner of mounting and operating plungers employed in pressing the glassware to form within the molds.

A further object of my invention is to provide an improved manner of operating hinged mold sections to open and close the same, whereby they may be very tightly closed even though there is looseness in their hinges through wear or otherwise.

While the invention is hereinafter described as employed in the making of pressed glassware, it will be understood that it may be useful also in giving preliminary shape to parisons that may later be completed on a blowing machine.

Figure 1:
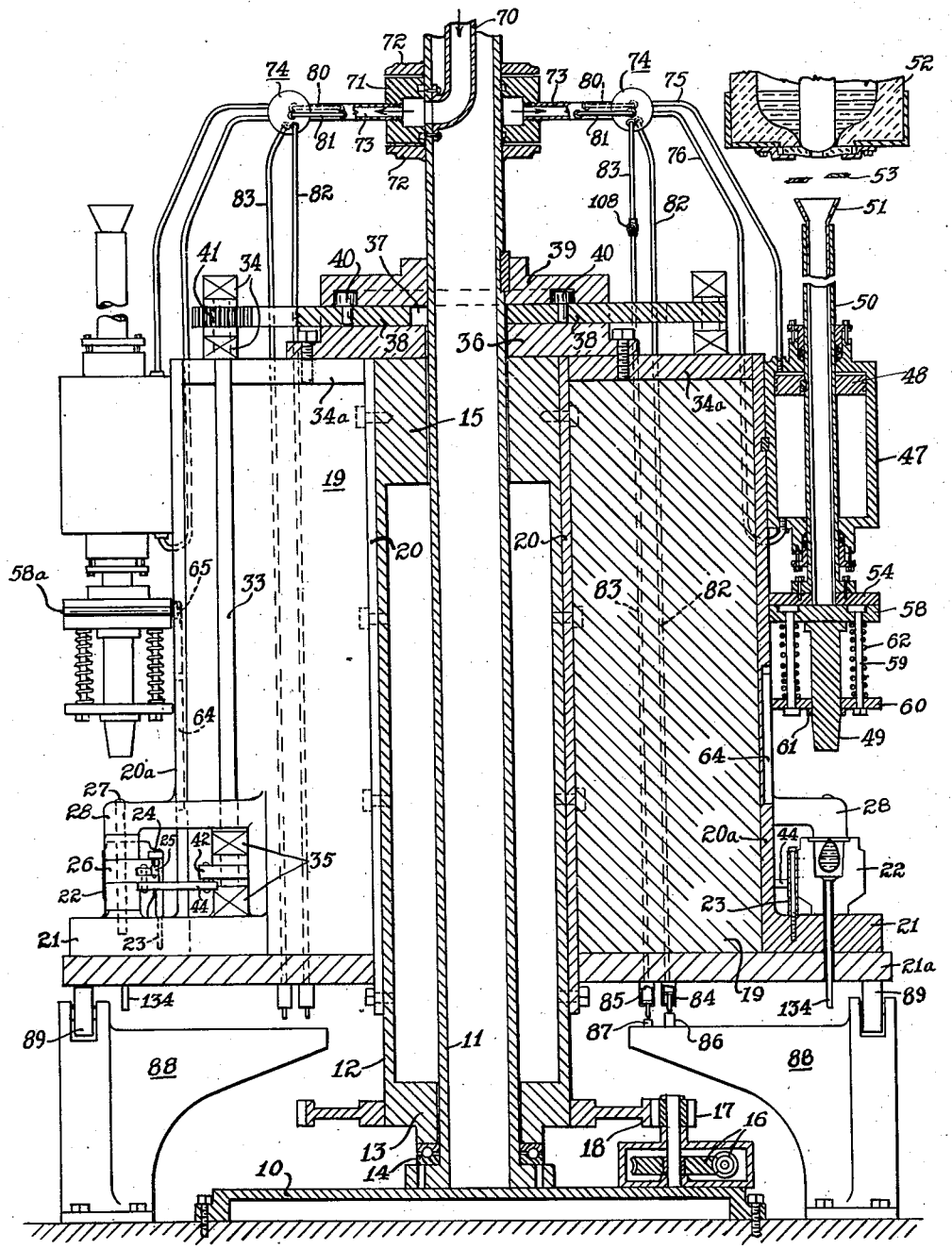
Figure 5:
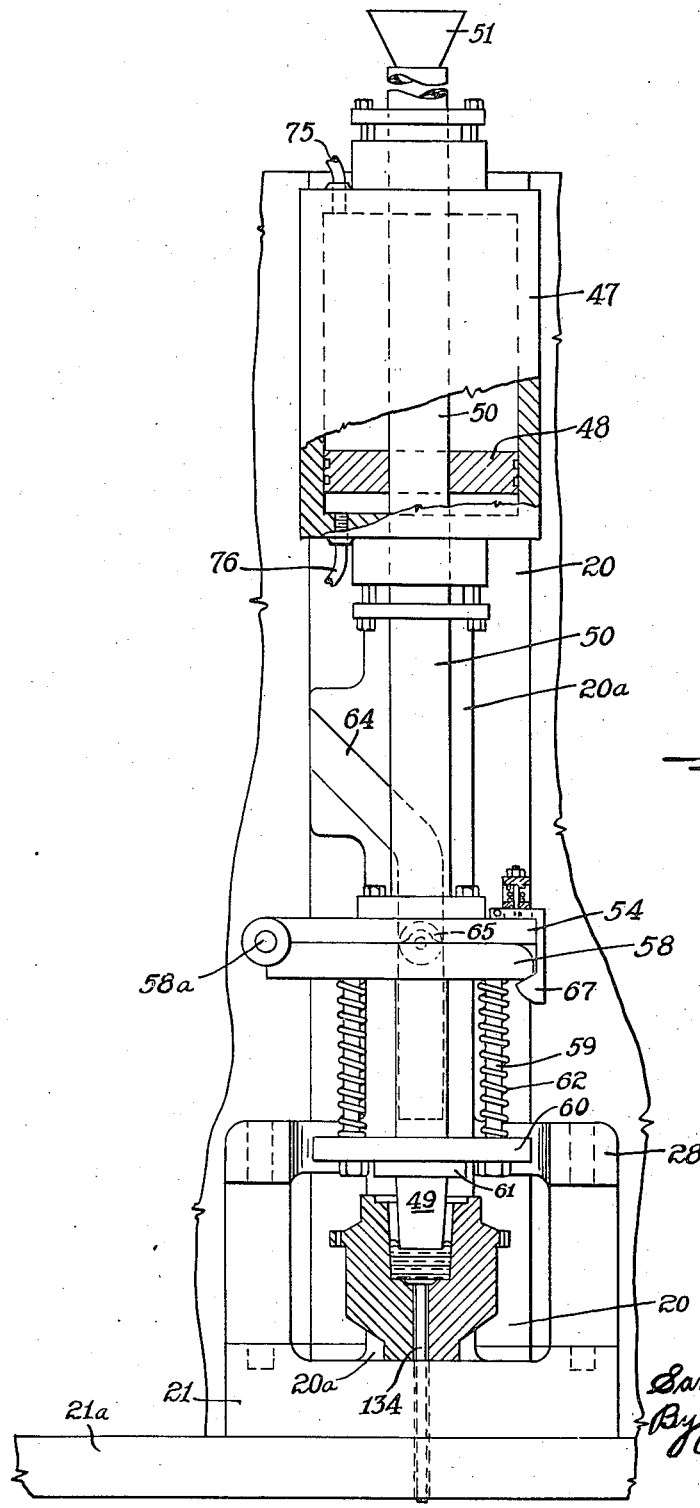
Figures 12, 13:
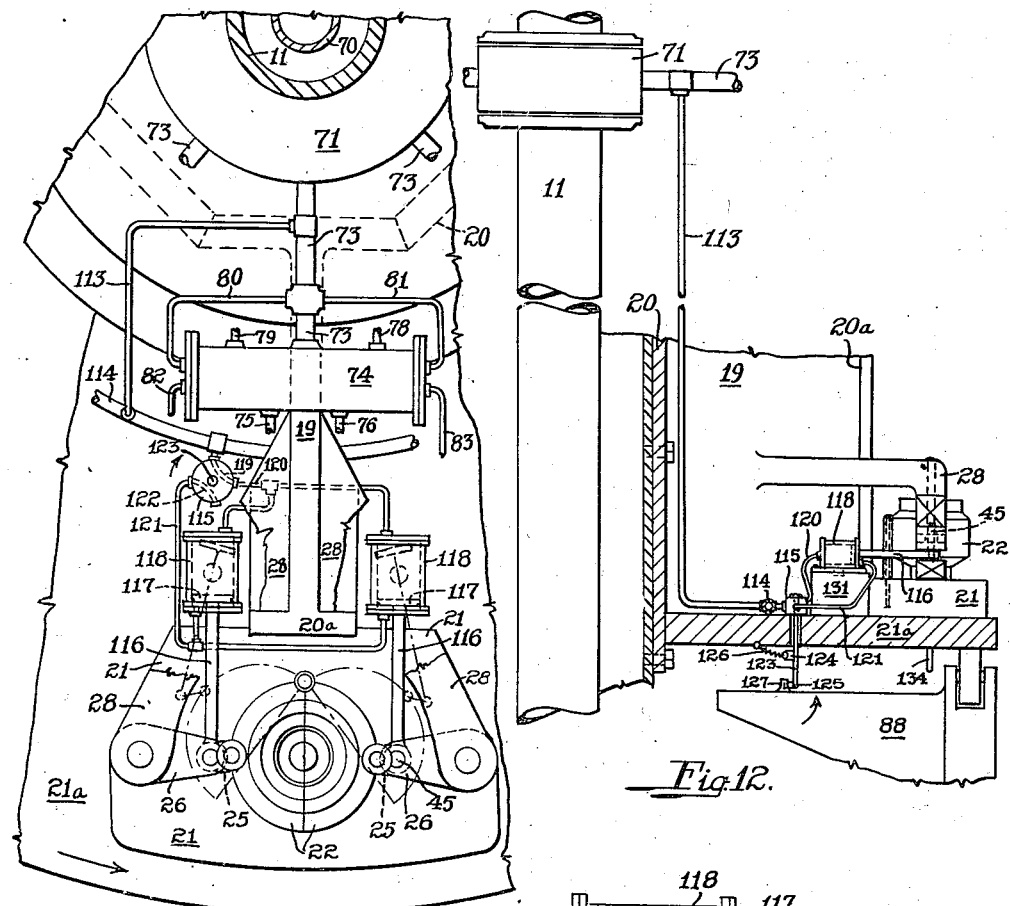
Figure 14:
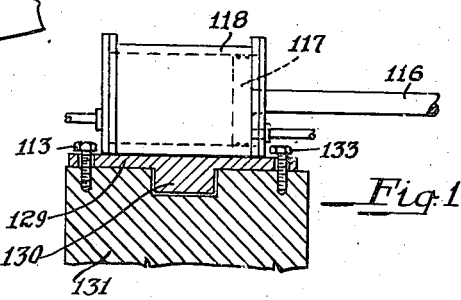
Figure 15:
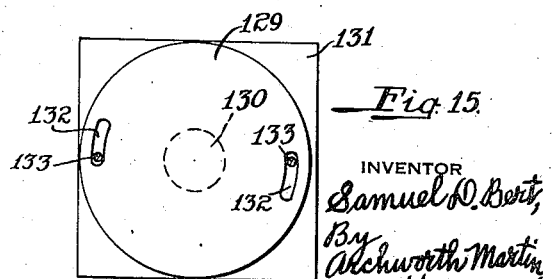

Figure 1 is an enlarged vertical sectional view through the machine, taken on the line I—I of Fig. 2; Fig. 2 is a plan view of the structure of Fig. 1, with certain of the parts omitted, showing the positions occupied by various of the mold members and their operating links, at different points in their path of travel; Fig. 3 is a face view, on an enlarged scale, of one of the molds of Fig. 1 and certain of its operating members; Fig. 4 is a plan view of the structure of Fig. 3; Fig. 5 is an elevational view, partly in section, showing one of the molds of Fig. 1 and its pressing plunger, with means for operating said plunger, on an enlarged scale; Fig. 6 is a vertical sectional view showing certain of the parts of Fig. 5 in a different position, with the plunger raised out of the mold and swung aside to permit the introduction of a glass charge into the mold; Fig. 7 is a view showing a portion of the fluid pressure control apparatus and system for controlling the supply of fluid pressure to the plunger-operating piston of Fig. 5; Figs. 8 and 9 show modifications of the structure of Figs. 5 and 6; Fig. 10 shows a modification of the structure of Fig. 8; Fig. 11 is a face view of a portion of the apparatus of Fig. 10; Fig. 12 is an elevational view showing a modification of the mold-operating apparatus of Fig. 4; Fig. 13 is a plan view thereof, and Figs. 14 and 15 are sectional views and elevational and plan showing the manner in which the mold-operating cylinders of Fig. 13 are mounted.

The apparatus comprises a base plate 10 to which is rigidly secured a central stationary column 11. A rotatable column 12 has an internal flange or rib 13 that is supported upon an anti-friction bearing 14. At its upper end the column 12 has an internal rib 15 that serves as a bearing member for engagement with the column 11. The column 12 is octagonal on its peripheral surface, as shown in Fig. 2, and a presser unit is connected to each of the octagonal surfaces, as hereinafter explained. The column is driven from a suitable source of power through a worm gear unit 16, a pinion 17 and a ring gear 18 that is rigidly connected to the lower end of the column 12.

A mold-carrying arm or wing 19 is secured to each octagonal face of the column 12, such wings having vertically-extending flanges 20 that are connected to the octagonal faces by screws. Each wing 19 carries a vertically-extending face plate 20a, that at its lower end has a mold-supporting ledge or flange 21 for supporting a mold 22. An annular plate or mold table 21a is secured to the members 19 and 20a. The molds are formed in two sections that are hinged together, so that the mold halves can be opened and closed by linkage mechanism to be hereinafter described.

The mold halves are pivotally connected to the ledges 21, as indicated at 23, and each mold half has a perforated ear 24 to which a short link 25 is pivotally connected. The link 25 is in turn pivotally connected to a link 26, whose outer end is pivotally connected through a pin 27 to a pair of bracket arms 28 that are carried by the face plate 20a. The links 25 and 26 thus form a toggle for use in opening and closing the molds. The pin 27 has loose fit with the link 26 but a snug fit with the arms 28, so that the link can be adjusted longitudinally of itself, with respect to the pivot pin and the arms 28, to insure proper snug closing of the mold halves (see Fig. 4). A bearing block 29 is loosely positioned between each pair of arms 28 and is held in firm engagement with the pin 27 by a wedge block 30, which is adjusted longitudinally of itself upon a screw stud 31 that is carried by the link 26, by the turning of a pair of nuts 32. It will be seen that if the mold halves are not snugly closed by the mechanism hereinafter described, the wedge 30 will be moved in slightly to shift the links 26 toward the axis of the mold, thereby insuring that the mold halves will be brought tightly together when the links 25 and 26 are moved into parallelism with one another.

The column 12 which carries the molds is constantly rotated and the molds 22 are periodically opened and closed by means of mechanism which will now be described. This mechanism comprises a pair of vertical shafts 33 for each of the molds, the shafts being journalled at their upper and lower ends in bearings 34 and 35 that are carried by the arms or wings 19, the upper bearings 34 being mounted on plates 34a that are secured to the upper edges of the wings 19, the shafts extending down opposite sides of each wing 19.

A collar 36 is secured to the column 12 so as to turn therewith and is provided with a series of radial slots 37 that serve as guide ways for rack bars 38. A collar 39 is keyed to the stationary column 11 and has a camming slot for receiving camming lugs or rollers 40 which are carried by the rack bars 38, so that as the column 12 is rotated, these rack bars will be shifted radially. The rack bars near their outer ends engage with gear pinions 41 that are secured to the upper ends of the shafts 33, so that said shafts will be oscillated through radial shifting of the rack bars 38. At their lower ends the shafts 33 carry crank arms 42 that have pivotal connection at 43 with links 44, the links 44 being connected to pivot pins 45 that also connect the toggle links 25 and 26.

It will be seen that as the mold-carrying column 12 rotates, the rack bars will be oscillated to open and close the molds, as indicated in Fig. 2. Thus, when a rack bar has been drawn by the cam slot to its innermost position, the mold sections are closed, this position being occupied during the feeding of a charge of glass into the mold and during the shaping of the glass in the mold. When each mold unit approaches the station at which the shaped glass article is to be removed from the mold, the curvature of the cam slot is such that the rack bar will be forced outwardly to cause the links 44 to be drawn inwardly, thus breaking the toggle 25—26 and separating the mold halves. When the mold unit has passed this station, the rack bars will again be drawn inwardly to close the mold and make it ready to receive another charge of glass.

A cylinder 47 and a piston 48 for operating a pressing plunger 49 that shapes the glass within the mold, are mounted against each face plate 20a, near the upper end of the plate, in vertical alignment with the mold carried at the lower end of such plate. A metal tube 50 extends through each cylinder and is rigidly secured to the piston 48 and serves as a piston rod. The tube has a renewable liner 51 that is flared at its upper end to receive charges of glass from a furnace indicated diagrammatically at 52, the charges of glass being sheared by knives indicated at 53, in a manner well known in the art, the knives being operated each time a charging tube 50—51 reaches charging position. The charge of glass falls through the tube and thence into the mold, the pressing plunger 49 having first been swung to one side as hereinafter explained.

The lower end of the tube 50 has secured thereto a bracket member 54 (Figs. 5 and 6) to which is pivotally connected a plate 58 which carries hanger bolts 59 and to which is secured the upper end of the plunger 49. A plate 60 is loosely supported on the nuts at the lower ends of the bolts 59 and carries a neck ring member 61 that seats within the upper recessed end of the mold 22, during a pressing operation, to confine the glass within the mold. Springs 62 are interposed between the plate 60 and the plate 58, so that the neck ring 61 can yield upwardly slightly during a pressing operation, in case there is a surplus of glass in the mold.

After the mold and its filling tube passes the charging station, air pressure is admitted to the upper side of the piston 48 as hereinafter explained, to force downwardly the piston and the piston rod 50, together with the bracket 54 and the parts carried thereby, so that the plunger 49 will enter the mold and shape the glass therein. Continued travel of the table will cause relief of the pressure from the upper side of the piston and cause air pressure to be admitted to the underside thereof to lift the plunger out of the mold. During this upward movement of the bracket, the plunger and its supporting plate 58 are swung away from the lower end of the tube 50, so that another charge of glass can be introduced into the mold when the charging station is reached. The swinging of the plunger to and from its pressing position is effected by means of a cam slot 64 (Figs. 5 and 6) formed in the outer surface of the face plate 20a. The plate 58 carries a roller 65 that rides in the cam slot, so that when the bracket 54 is raised from pressing position by the piston 48, the hinged plate 58 that carries the plunger will be tilted sidewise to the position shown in Fig. 6, as the cam roller 65 passes from the vertical portion of the slot 64 to the inclined portion thereof. In this raised and tilted position of the plate 58, a charge of glass can pass through the tube 50 into the mold 22. Upon downward movement of the piston and the bracket 54, the plunger-carrying plate 58 will of course also be moved downwardly and the roller 65 moved from the inclined portion of the slot to the vertical portion thereof, thus bringing the plunger into vertical position beneath the piston rod 50, so that continued downward movement of the piston will move the plunger into the mold. A spring-pressed latch 67 is carried by the bracket 54 for releasably holding the plunger and its associated parts snugly against the bracket, and to maintain it against shifting or vibration during actual pressing of the glass. The latching surfaces of the plate 58 with the spring 67 are inclined somewhat so that the plate 58 will automatically be disengaged from the spring clip when the cam roller reaches the upper portion of the slot 64.

Air pressure for operating the pressing plunger is supplied from a suitable source through a pipe 70 that extends into the stationary column 11 and through a side wall of the column. A header ring 71 is loosely supported on the column 11, between collars 72 that are fixedly secured to the column 11, said header ring having an annular slot or chamber and having an outlet pipe 73 leading to each valve casing 74. A valve casing 74 is provided for each pressing unit and has connection therewith through pipes 75 and 76 that lead to the upper and lower ends of the cylinder 47 (Fig. 1). These pipe connections cause the header ring 71 to be rotated with the column 12.

When a valve 77 within the casing 74 is in the position shown in Fig. 7, live air from the pipe 73 will be supplied through the pipe 76 to the underside of the piston 48, and when the valve 77 is in its opposite position within the casing 74, live air will flow from the pipe 73 through the pipe 75 to the upper side of the piston 48, exhaust from the lower side of the piston being effected through the pipe 76 and an exhaust port 78. An exhaust pipe 79 is provided for exhausting air from the upper side of the piston 48 when the piston is moving upwardly through the influence of pressure from the pipe 76.

Shifting of the valve 77 to change the port openings is effected by pressure admitted from the pipe 73 through branch pipes 80 and 81 and through the ends of the casing 74. Bleed pipes 82 and 83 lead from the ends of the casing 74 downwardly to the lower part of the machine and are provided with inwardly opening check valves 84 and 85 respectively, at their lower ends. These check valves have projecting stems that are brought into engagement with camming lugs 86 and 87 respectively, that are mounted upon a stationary bracket 88. When the valve stems engage these camming lugs, the valves are moved from their seats to permit exhaust of air from the lower ends of the pipes 82 and 83 and consequently from the ends of the valve casing 74. The camming lugs or tracks 86 and 87 are positioned at such points that after a mold has received a charge of glass, continued movement of the mold carrier will temporarily bring the valve 85 into contact with a raised portion of the cam 87 to effect opening of the valve and bleeding of pressure through the pipe 83, so that pressure from the pipe 80 acting upon the other end of the valve 77 will shift said valve so as to bring the pipe 73 into communication with the valve port that leads to the pipe 75, and to thereby also bring the pipe 76 into communication with the port leading to the exhaust port 78. The piston 48 will thereupon be moved downwardly and a pressing operation performed.

Continued movement of the mold carrier after the pressing operation will carry the valve 85 out of contact with the camming lug 87, permitting the valve to close, and will bring the valve 84 into engagement with the camming lug 86, thereby effecting opening of the valve 84 and permitting exhaust through the pipe 82. Exhaust through the pipe 83 having been closed, the air pressure from the pipe 81 will thereupon shift the valve 77 to the position shown in Fig. 7, whereupon air from the pipe 73 will flow to the pipe 76 and the underside of the piston 48, to raise the piston, exhaust from the upper side of the piston being through pipe 75, past the valve 77 and out the exhaust port 79. Further movement of the mold carrier will carry the valve 84 out of engagement with the camming lug 86 and permit the valve 84 to close, the valves 84 and 85 then remaining closed until the mold carrier reaches a point at which it is desired to operate the piston 48, whereupon the valve 85 will be opened by the camming lug 87, to repeat the sequence of operations above described.

It will be understood that the valves 84 and 85 are held open only a short time by the camming lugs 86 and 87, in order to avoid unnecessary waste of air pressure. Each valve needs to be open only long enough to permit unbalancing of pressures at the ends of the valve 77 for the short time required to effect shifting of said valve.

The brackets 88 also carry rollers 89 which will be used to brace and support the table—particularly when heavy pressing operations are employed.

In Fig. 8 I show a modification of the apparatus of Fig. 6, for moving the plunger 49 away from beneath the feed tube 50. In this arrangement a bracket 90 is secured to the cylinder 47 and carries a cylinder 91. The cylinder has a piston 92 provided with a piston rod 93 that is connected to an arm 94, which is slidably supported on the bracket 90. The arm 94 is forked at its lower end for engagement with an upstanding lug on a plate 95 that corresponds to the plate 58. This plate 95 is slidably supported upon a slideway 96 that is carried by a bracket member 97 that corresponds to the bracket member 54 and is secured to the lower end of the piston 50. When fluid pressure is admitted to the outer end of the cylinder 91 through a pipe 98, the piston 92 is moved inwardly to pull back the member 95 together with the hanger bolts 62 and the plunger 49, so as to leave a clear space beneath the feed tube or piston 50 to permit a charge of glass to fall into the mold. Pressure is then admitted to the inner end of the cylinder 91 through a pipe 99 to shift the plunger back to the position shown in Fig. 8, whereupon downward movement of the piston 48 will move the member 97, the plunger 49 and the parts associated therewith downwardly, to project the plunger into the mold.

When the piston 48 is again raised, the upstanding lug on the member 95 will again enter the forked end of the member 94.

It will be understood that various means well known in the glass-forming machine art can be provided for admitting fluid pressure through the pipes 98 and 99 to the ends of the cylinder 91, in timed relation to movement of the mold carrier. For example, the supply and control of fluid pressure to the cylinder 91 can be effected in substantially the same manner as in the case of the mold-operating cylinders and pistons of Figs. 12 and 13. It will also be understood that some well known feeder mechanism will be provided for supplying the charges of glass from the furnace 52 and for operating the shears 53 each time that a presser unit reaches feeding position.

Referring now to Fig. 9, I show a spring-pressed guide plate 101 backed by springs 102, for maintaining the plunger-carrying plate 58 snugly against the bracket 54 and to prevent vibration of the plate and the plunger during pressing operations, and rendering unnecessary the use of the latch 67 of Fig. 6. The plate 101 constitutes a portion of the wall of the slot 64 and is engaged by the roller 65 during lowering movement of the pressing plunger 49, to direct the plunger in proper vertical alignment with the mold and to steady it against lateral vibrations.

Fig. 10 is a modification of the apparatus shown in Fig. 8 and shows a safety feature whereby the plunger piston 48 is prevented from descending in case the plunger 49 is not in proper vertical alignment with the hollow piston rod 50. The bleed pipe 83 is deflected sidewise for connections with a port or passageway 104 in the bracket 90, and with a passageway 105 in the end plate 106 of the cylinder 91. A port 107 is provided through the piston rod 93 and will be in registry with the pipe 83 and the port 105 when the plunger 49 is in vertical alignment with the piston rod 50, so that when the bleed valve 85 is opened, the valve 77 will be shifted to a position where fluid pressure will flow from the pipe 73 through pipe 75 to the upper side of the piston 48 and effect a pressing operation. If for any reason the piston 92 is not moved far enough to the left to bring the plunger 49 into alignment with the piston rod 50, air cannot flow through the pipe 83 to the bleed valve 85 and consequently the piston 48 will remain in its uppermost position.

Downward movement of the piston 48 can be manually controlled by a valve 108 (Figs. 1 and 10) provided in the line 83. If for some reason it is desired to throw one of the pressing units out of operation, the valve 108 of that unit will be closed to prevent bleeding through the pipe 83, thereby causing the valve 77 to remain in the position shown in Fig. 7, at which position fluid pressure will flow only to the underside of the piston 48; the piston 48, with the plunger, being thereby maintained in raised position.

In Figs. 10 and 11 a guide tube 109 is connected to the slide plate 95 and the plate 60 by yokes 110 and 111 respectively, the tube 109 being snugly held by the yoke 110 and slidably engaging the yoke 111. When the plunger-carrying plate 95 is withdrawn laterally, to move the plunger 49 from beneath the tubular piston rod 50, preparatory to the feeding of a charge of glass into the mold 22, the guide tube 109 will be in vertically-aligned position with the tube 50 and serve to direct the charges of glass into the mold. Upon forward movement of the piston rod 93 to bring the plunger into pressing position, the tube 109 will of course be carried away from beneath the tube 50.

In Figs. 12 to 15 I show a manner in which the toggle mechanism for opening and closing the molds is pneumatically operated instead of being operated by the use of cams and rack bars as in Figs. 1 to 4. In this arrangement, air under pressure from the header ring 71 is supplied through one of the pipes 73 and through a pipe 113, to a header pipe 114. Rotary valves 115 have communication with the annular header pipe 114, a valve 115 being provided for each mold. The toggle links 25 and 26 are operated through reciprocation of the piston rods 116 to open and close the molds. The piston rods are provided with pistons 117 that are contained within cylinders 118.

When the valve 115 is in the position shown in Fig. 13, air will flow through its port 119 and a pipe 120 to the rear ends of the cylinders 118, thus forcing the pistons 117 forwardly and straightening the toggle links 25—26 to close the mold sections. Exhaust from the front sides of the piston takes place through a pipe 121 and valve port 122. When the valve 115 is in its opposite position, the port 119 will be brought into registry with the line 114 and the pipe 121, to admit fluid pressure to the front sides of the pistons and thereby effect opening of the mold sections. Exhaust at this time occurs from the rear side of the pistons through pipe 120 and port 122.

The valve 115 is periodically operated during movement of the mold carrier, by its stem 123 that extends downwardly and has a pair of laterally-extending arms 124 and 125 which function as crank arms to effect rotative movements of the valve. The valve is normally held by a spring 126 in the position shown in Fig. 12, at which position the mold 22 is closed. A camming rail 127 is positioned on the brackets 88 and extends beneath the zone in which the molds are to be in their opened positions (Fig. 2) and it will be engaged by the arm 125, so as to cause the valve 115 to be rotated into position that fluid pressure will flow through the port 119 to the front sides of the pistons 117, to effect opening of the molds. After the ware has been removed from a mold, the arm 125 will pass out of engagement with the cam rail 127, thus allowing the spring 126 to return the valve to its former position and to effect closing of the molds preparatory to receiving another charge of glass.

In order to prevent binding of the pistons and piston rods in their respective cylinders, because of the slight arcuate movement of the piston rods, which occurs through operation of the toggle mechanisms, I secure each cylinder to a base plate 129 that has a circular boss 130 fitting within a recess in a block 131 that is secured to the mold table 21a. The plate 129 has arcuate slots 132 through which screws 133 extend and have threaded engagement with the block 131. The screws 133 are not turned down tightly, so the cylinder 118 with its base plate 129 can have slight swiveling movement on the block 131 during operation of the toggle mechanism. The pipes 120 and 121 are of rubber hose, so that they will flex slightly, to permit of said movement.

While I have more particularly described apparatus for performing pressing operations on glass, it will be understood that the pressing units can be incorporated in a machine that contains also blow heads for expanding charges of glass in molds, after they have been preliminarily shaped through a pressing operation, such machines commonly being known as press-and-blow machines, and widely used in the glass industry. Also, it will be understood that the pressing units can be used with what are known as "block" molds, as distinguished from two-part molds, in which case the opening and closing apparatus for the molds would not be required, and an ejector rod 134 (Fig. 1) is provided for pushing the finished ware up so that it can conveniently be grasped and lifted from the mold.

Again, while the specification refers more particularly to the forming of glassware, the apparatus can be employed in the pressing of other plastic materials such as clays and synthetic plastics.

I claim as my invention:

1. A glass-forming machine comprising a rotatable mold carrier, molds mounted on said carrier, a vertically-disposed presser cylinder mounted on the carrier above each mold, a piston in the cylinder, a tubular piston rod extending through the cylinder and connected to the piston, a bracket carried by the lower end of the tubular rod, a pressing plunger carried by said bracket and normally in axial alignment with the piston rod, means for admitting pressure to the ends of the cylinder to effect raising and lowering movement of the piston rod and said plunger to perform pressing operations in a mold, and means for moving the plunger laterally out of alignment with the lower end of the piston rod when the plunger has been lifted from the mold, to permit charges of glass to be introduced into the mold through the said rod.

2. Glass-forming apparatus comprising a vertically-disposed presser cylinder, a piston in the cylinder, a tubular piston rod extending through the cylinder and connected to the piston, a bracket carried by the lower end of the tubular rod, a presser plunger carried by said bracket, a mold positioned beneath the plunger, means for admitting fluid pressure to the ends of the cylinder, to effect vertical movements of the plunger, to perform pressing operations in the mold, and means for shifting the plunger laterally when it has been lifted from the mold, to permit charges of glass to be dropped through the piston rod into the mold.

3. A glass-forming machine comprising a rotatable carrier, molds on said carrier, a glass-pressing plunger positioned above each mold and movable with the carrier, the plunger being normally in axial alignment with the mold, means for lowering and raising the plunger into and from the mold, means for moving the plunger out of axial alignment with the mold, in a direction radially of the carrier, when the plunger is withdrawn from the mold, and means on the carrier, in axially-fixed alignment with the mold, for directing charges of glass into the mold when the plunger is out of axial alignment with the mold.

4. A glass-forming machine comprising a rotatable carrier, molds on said carrier, a vertically-extending feed tube on the carrier and disposed in axially-fixed alignment with the mold, a pressing plunger on the carrier, below the feed tube, and normally in axial alignment with the mold and said tube, a vertically-reciprocable member for raising and lowering the plunger, and means for shifting the said plunger out of said axial alignment, when it is withdrawn from the mold, whereby a charge of glass may be introduced through said tube into the mold.

5. A glass-forming machine comprising a rotatable carrier, molds on said carrier, a glass-pressing plunger positioned above each mold and movable with the carrier, the plunger being normally in axial alignment with the mold, a device for lowering and raising the plunger into and from the mold, means automatically operated in timed relation to vertical movements of the plunger, for moving it into and out of axial alignment with the mold, and into operative and inoperative relationship with said device, and means on the carrier for directing charges of glass into the mold when the plunger is in raised position and is out of axial alignment with the mold.

6. A glass-forming machine comprising a rotatable carrier, molds on said carrier, a glass-pressing plunger positioned above each mold and movable with the carrier, devices operable during rotative movement of the table, for lowering and raising the plungers into and from the molds, means automatically operable upon raising movement of each plunger for moving it out of axial alignment with its mold, and means on the carrier, in axially-fixed alignment with each mold and above the adjacent plunger, for directing charges of glass into the molds when their plungers are out of axial alignment therewith.

7. A glass-forming machine comprising a rotatable carrier, molds on said carrier, a vertically-extending feed tube on the carrier and disposed in axial alignment with the mold, a pressing plunger below the feed tube and normally in axial alignment with the mold, a vertically-reciprocable member for raising and lowering the plunger, means for shifting the said plunger out of said axial alignment, when it is withdrawn from the mold, a guide tube, and means for shifting said guide tube into position between the feed tube and the mold, upon shifting of the plunger out of said axial alignment, whereby charges of glass may be introduced through said tubes into the mold.

8. A glass-forming machine comprising a rotatable carrier, molds on said carrier, a glass-pressing plunger positioned above each mold and movable with the carrier, the plunger being normally in axial alignment with the mold, means for lowering and raising the plunger into and from the mold, means for moving the plunger out of axial alignment with the mold, when the plunger is withdrawn from the mold, and means controlled by the last-named means for moving the plunger, for preventing operation of the first-named means to lower the plunger when the plunger is out of said axial alignment.

9. A glass-forming machine comprising a rotatable carrier, molds on said carrier, a glass-pressing plunger positioned above each mold and movable with the carrier, the plunger being normally in axial alignment with the mold, a piston, means for subjecting the opposite sides of the piston to fluid pressure for lowering and raising the plunger into and from the mold, a reciprocable member for moving the plunger into and out of axial alignment with the mold, when the plunger is withdrawn from the mold, and means on said member for preventing admission of fluid pressure to the upper side of the piston, when the member is in such position that the plunger is out of axial alignment with the mold.

10. A glass-forming machine comprising a mold, a glass-shaping plunger normally positioned above the mold and in axial alignment therewith, means for raising and lowering the plunger, a device for shifting the plunger out of axial alignment with the mold, when the plunger is in raised position, and means controlled by said device for preventing lowering movement of the plunger when the plunger is out of axial alignment with the mold.

SAMUEL D. BERT.